United States Patent [19]
Blake et al.

[11] Patent Number: 5,970,796
[45] Date of Patent: Oct. 26, 1999

[54] PRESSURE GAUGE HAVING A DIAPHRAGM SECURED STAKED WITHIN THE ENCLOSURE

[75] Inventors: Jeffrey T. Blake, Milford; Talivaldis I. Maidelis, Cheshire, both of Conn.

[73] Assignee: Dresser Industries, Inc., Dallas, Tex.

[21] Appl. No.: 09/052,549

[22] Filed: Mar. 31, 1998

Related U.S. Application Data

[60] Provisional application No. 60/043,091, Apr. 15, 1997.

[51] Int. Cl.$^6$ ........................................................ G01L 7/08
[52] U.S. Cl. ................................................. 73/715; 29/509
[58] Field of Search ................................ 73/715; 29/509, 29/525.05, 525.07; 156/91, 308.4, 309.6, 290

[56] References Cited

U.S. PATENT DOCUMENTS

| | | |
|---|---|---|
| 1,572,970 | 2/1926 | Stalker . |
| 3,844,025 | 10/1974 | Lingnau . |
| 4,488,341 | 12/1984 | Scott et al. . |
| 5,181,422 | 1/1993 | Leonard et al. . |
| 5,297,428 | 3/1994 | Carr et al. .................................. 73/290 |
| 5,741,975 | 4/1998 | Vaughn et al. ............................. 73/706 |

*Primary Examiner*—Joseph L. Felber
*Attorney, Agent, or Firm*—Daniel Rubin

[57] ABSTRACT

There is disclosed a pressure gauge construction in which a diaphragm assembly responsive to changing values of fluid pressure being supplied to the gauge is secured against an internal support surface of the casing by a combination of sealant and thermal staking.

13 Claims, 4 Drawing Sheets

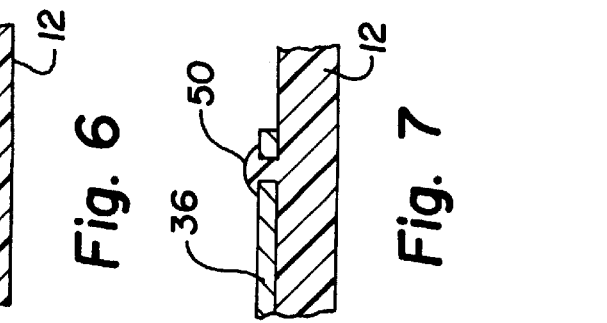
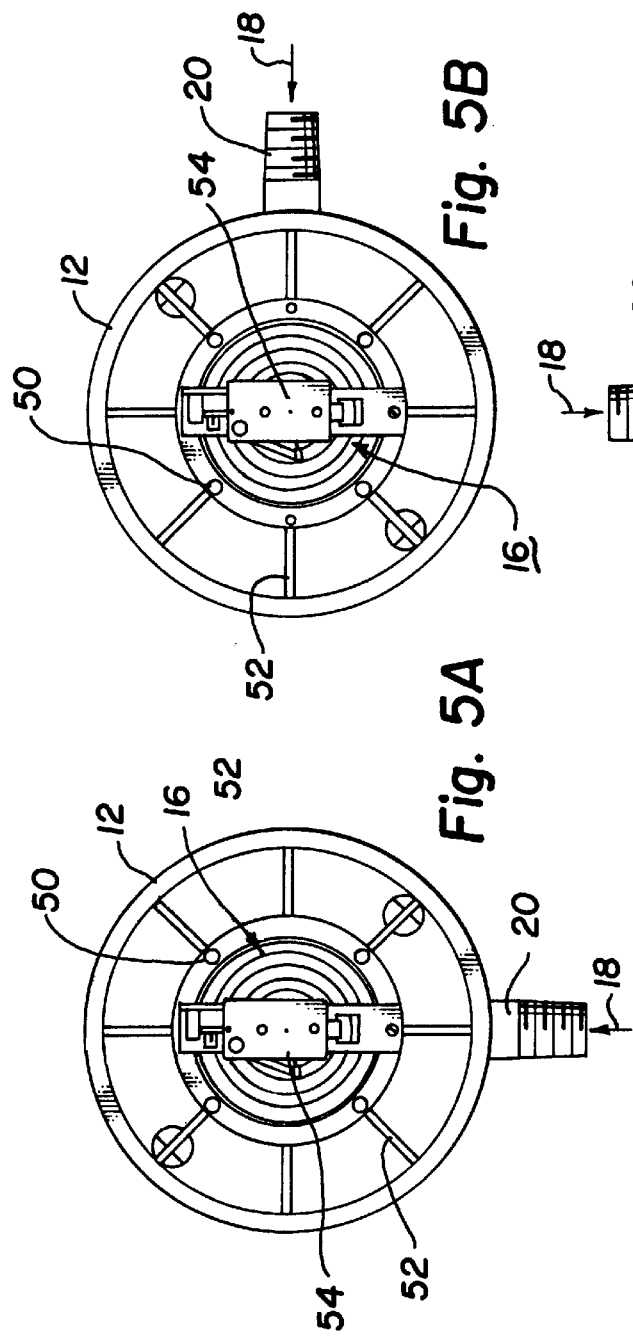

PRESSURE GAUGE HAVING A DIAPHRAGM SECURED STAKED WITHIN THE ENCLOSURE

This application claims the benefit of prior filed co-pending U.S. Provisional Application No. 60/043,091 filed Apr. 15, 1997.

FIELD OF THE INVENTION

The field of art to which the invention pertains includes the art of pressure gauges for the monitoring of pressure fluid and of a type in which an expandable diaphragm comprises the pressure sensing element.

BACKGROUND OF THE INVENTION

Pressure gauges are widely utilized in a myriad of different environments for commercial and industrial applications where measuring an indication of fluid pressure values is required. Values of pressure are usually displayed by a displaceable pointer opposite a dial plate containing graduations of pressure indicia. The gauge typically utilizes a pressure-sensitive element and incurs a predictable displacement in response to pressure changes to which it is exposed. The displacement is then translated via a movement or amplifier leading directly to the pointer that is displaced opposite the dial plate.

In a typical diaphragm-type pressure gauge, two diaphragms are joined spaced apart to create a pressure cavity. The assembly is then mounted in an enclosure using hardware such as screws, rivets, welding, etc. Other forms of diaphragm constructions are disclosed, for example, in U.S. Pat. Nos. 1,572,970; 3,844,025; 4,488,341; and 5,181,422. The latter patent is incorporated herein by reference.

While such prior gauge assemblies have functioned well, they have long been regarded as being two labor intensive and incurring costs beyond what would appear to be merited.

Despite recognition of the foregoing, a much simpler and more economically feasible construction of a diaphragm-type pressure gauge has heretofore been unknown.

OBJECTS OF THE INVENTION

It is an object of the invention to provide a novel construction for a pressure gauge utilizing an expandable diaphragm as the pressure-sensitive element.

It is a further object of the invention to effect the previous object with a construction requiring less labor intensity than heretofore as to result in a lower product manufacturing cost.

It is a still further object of the invention to effect the previous objects with a gauge construction that functions in a highly efficient manner and yet is substantially maintenance free.

SUMMARY OF THE INVENTION

This invention relates to pressure gauge apparatus, including an expandable diaphragm as the pressure-sensitive element. More specifically, the invention relates to such a pressure gauge that affords a novel combination of structure for assembling the diaphragm unit to within the gauge housing by eliminating the use of hardware in the manner of the prior art.

The foregoing is achieved herewith by means of a gauge construction utilizing a single diaphragm capsule attached internally of the gauge case in a pressure-tight relation surrounding an internal outlet aperture in the casing. Fluid pressure is communicated to the diaphragm capsule from an exterior stem. For installing the capsule assembly, the gauge case is provided with a plurality of angularly displaced laterally extending posts surrounding the outlet aperture in the casing. The diaphragm capsule assembly is comprised of a rigid back plate on which the diaphragm is concentrically secured in a seal-tight relation. An aperture in the back plate communicates with an internal cavity defined intervening between the back plate and the diaphragm. The back plate is of a diameter exceeding the diaphragm and about its peripheral portion includes a plurality of apertures angularly spaced corresponding to that of the posts in the casing.

To effect installation, a quantity of a selected sealant composition is placed in a recessed track of a support surface about the internal outlet in the casing, after which the diaphragm assembly is placed on the individual posts and against the sealant thereat. After placement, the posts are thermally deformed by heat staking so as to secure the diaphragm assembly in place while at the same time causing the sealant to create a pressure seal or gasket between the enclosure and the back plate of the diaphragm assembly. By having a plurality of individual posts that can be selected in a variety of combinations, it is possible to install the gauge stem in any of 3, 6, 9, and 12 o clock orientations.

As a consequence of the foregoing, a reliable, inexpensive and simple construction is utilized to attach a diaphragm assembly to within the casing of a pressure gauge affording a versatility of installation not previously known.

The above noted features and advantages of the invention, as well as other superior aspects thereof, will be appreciated by those skilled in the art upon reading the detailed description that follows in conjunction with the drawings.

BRIEF DESCRIPTION OF THE DRAWINGS

FIGS. 5(a), (b), (c) and (d) illustrate various clock orientations for positioning of the diaphragm assembly;

FIG. 6 is a fragmentary sectional elevation taken substantially along the lines 6—6 of FIG. 3 illustrating diaphragm placement onto the case; and FIG. 7 is a fragmentary sectional elevation similar to FIG. 6 illustrating the diaphragm secured in operative relation to the case.

DESCRIPTION OF THE PREFERRED EMBODIMENT

Figure 1:
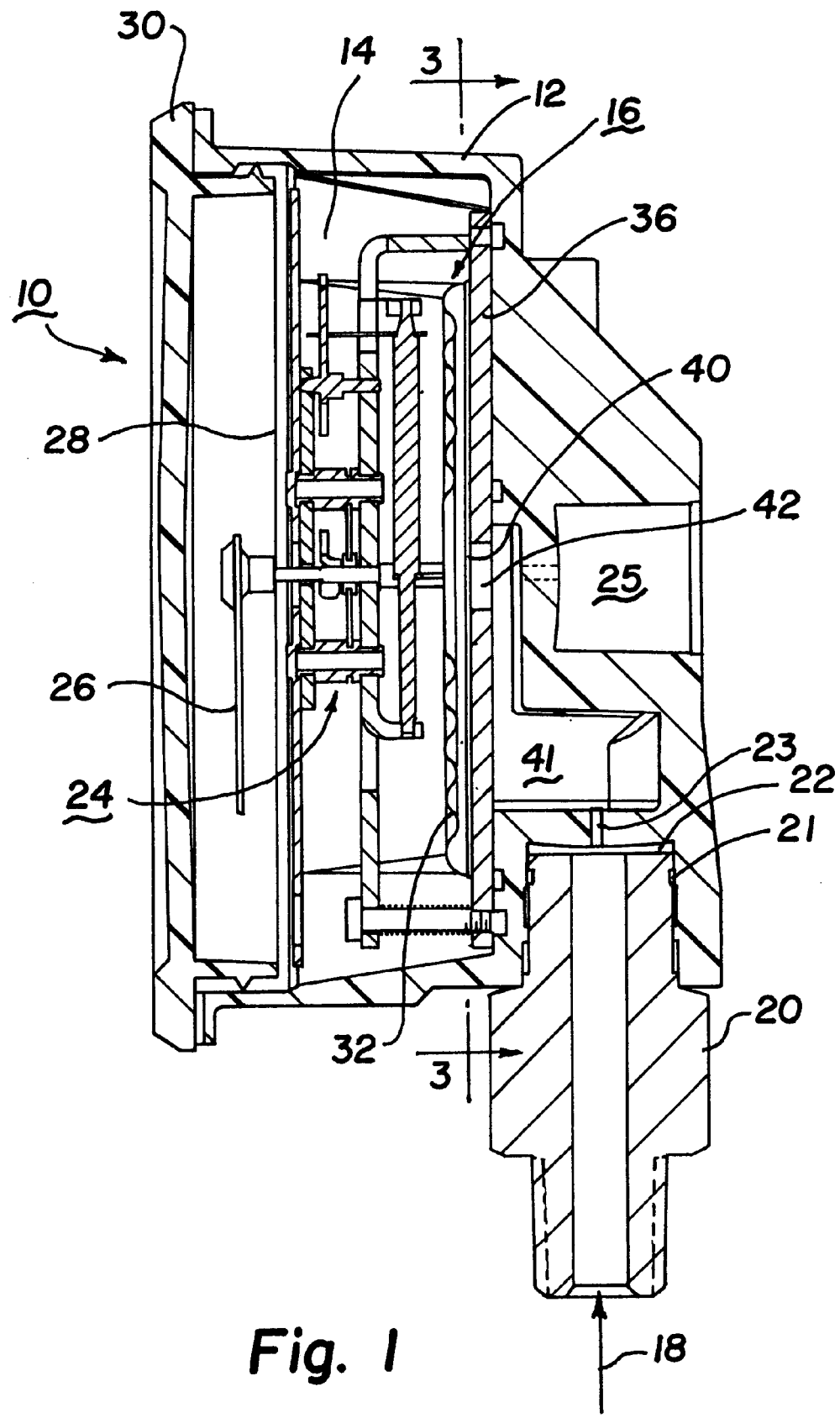
FIG. 1 is a side elevation partially sectioned of a pressure gauge in accordance with the invention hereof.

In the description which follows, like parts are marked throughout the specification and drawings with the same reference numerals, respectively. Drawing figures are not necessarily to scale and in certain views, parts may have been exaggerated for purposes of clarity.

Referring now to the drawings, there is illustrated in FIG. 1 a pressure gauge designated 10 comprising a casing 12 for enclosing operating components to be described. The casing is preferably formed of injection molded glass-filled polysulfone (PSU). Within cavity 14 of the casing there is secured a diaphragm assembly 16 into which fluid pressure 18 is communicated via vertical stem 20 (or optionally to a rear stem not shown in socket 25) secured pressure-tight via gasket 21 to socket 22. With a stem 20 in a selected socket, an aperture 23 is drilled through the casing wall thereat through cavity 41 to communicate inward thereof to outlet 43 exposed to cavity 14. Operative displacement of the diaphragm in response to changes in pressure values of the received fluid at outlet 43 effects lateral displacement of the diaphragm that via a movement 24 causes arcuate displacement of pointer 26 opposite a graduated dial plate 28. A glass containing bezel 30 secured about the front peripheral edges of the casing affords clear viewing of the pointer position relative to dial plate 28.

Figure 2:
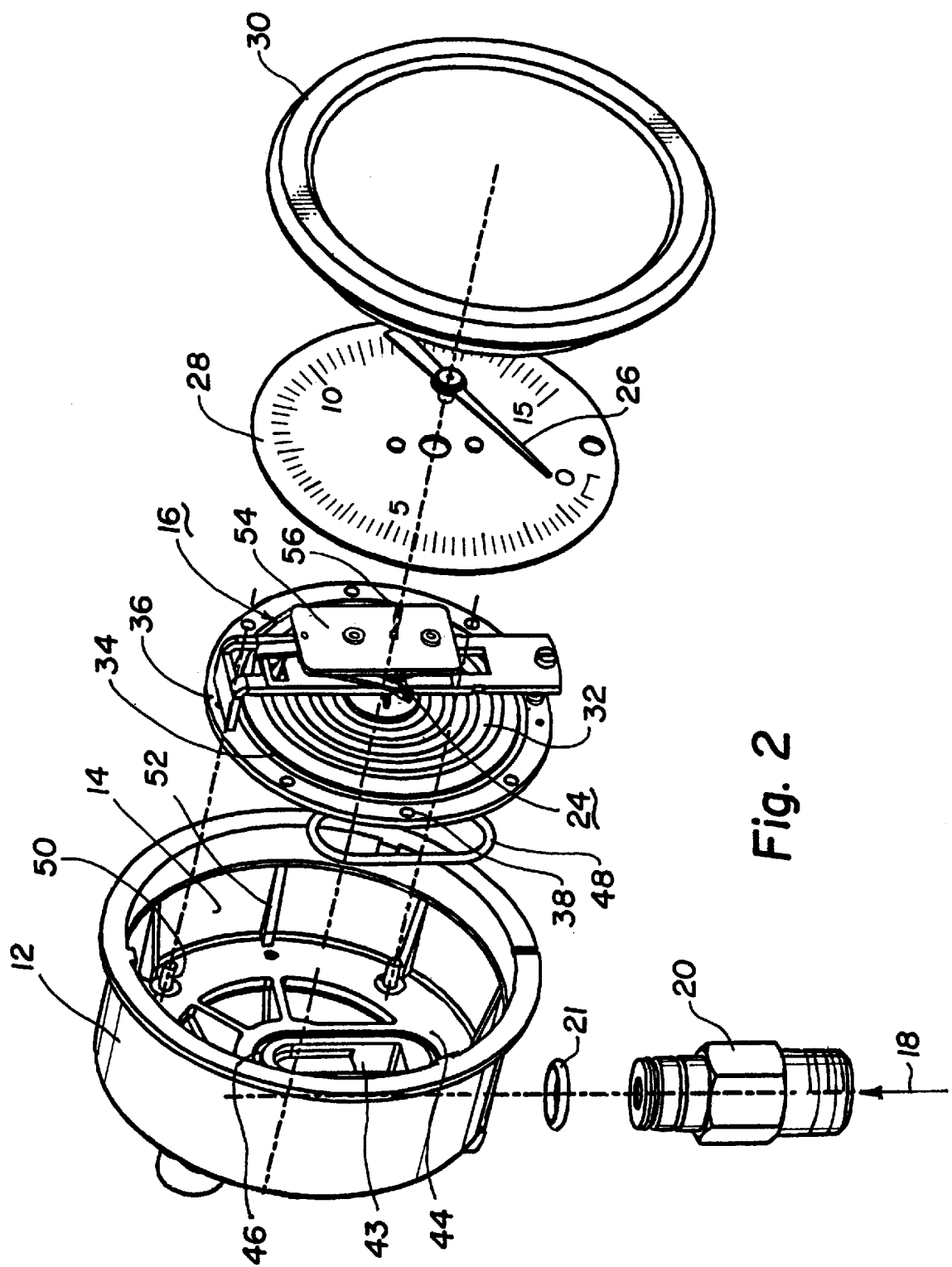
FIG. 2 is a an exploded isometric view of the pressure gauge of FIG. 1.
Figure 3:
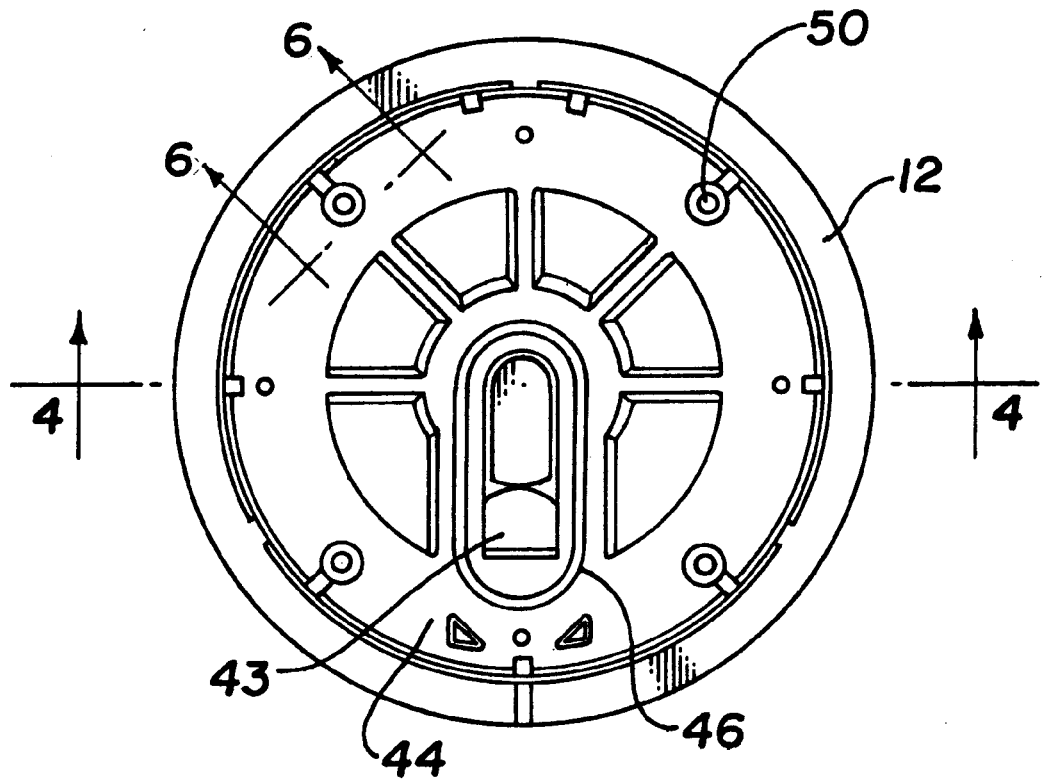
FIG. 3 is a sectional front elevation as seen substantially along the lines 3—3 of FIG. 1.
Figure 4:
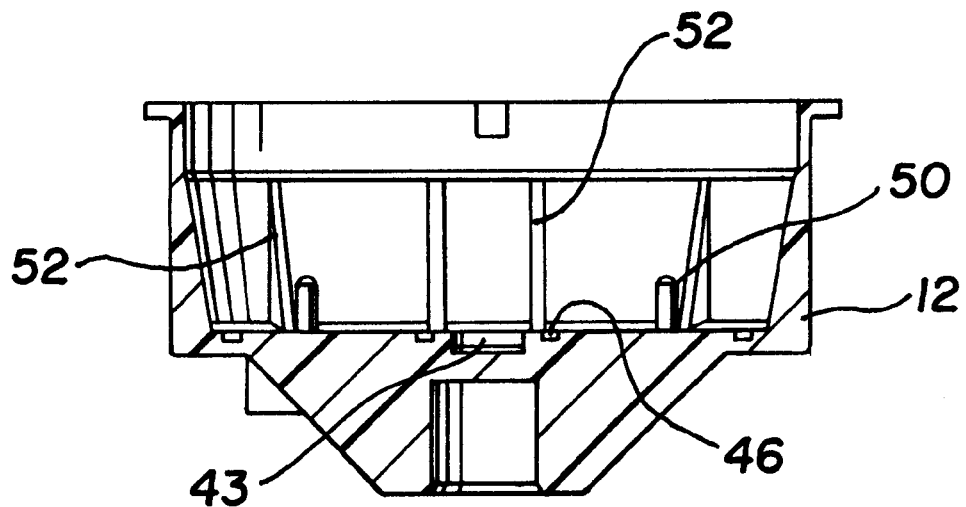
FIG. 4 is a sectional elevation as seen substantially along the lines 4—4 of FIG. 3.

As best seen in FIG. 2, diaphragm assembly 16 is preferably comprised of a raised front annular diaphragm 32 secured pressure-tight, as by welding, about an annular seam 34 to a rigid back plate 36. About the back plate beyond seam 34 is an annular flange containing a plurality of arcuately displaced apertures 38 for reasons as will be understood. Diaphragm 32 and rear plate 36 together define an intervening cavity 40, while an aperture 42 in back plate 36 communicates inwardly of the cavity.

As noted supra, internal cavity 14 of case 12 to which fluid pressure is received from stem 20 is communicated inward to an outlet 43. Within the flat surface 44 about outlet 43 is an oval shaped recess 46 into which a controlled quantity of a sealant 48 is disposed. Positioned concentrically outward thereof are a plurality of integrally extending individual lateral posts 50 adjacent radial reenforcing fins 52. The arcuate uniform spacing of posts 50 correspond to or are a multiple of the arcuate spacing of apertures 38 in the outer flange of diaphragm plate 36.

For these purposes, posts 50 preferably are arcuately spaced at twice the angle spacing between adjacent apertures 38 such that any combination of apertures 38 can be used for selectively orienting the diaphragm to accommodate gauge positions in one of the several orientations illustrated in FIGS. 5(a), (b), (c) or (d). Surrounding outlet 43, irrespective of whether a vertical stem 20 is utilized as shown in FIG. 1 or if the alternative back connection socket 25 is utilized, the flat oval shaped shallow recess track 46 is provided with a bead of a commercially available sealant 48, such as Loctite (TM) 5900 RTV sealant, dispensed just prior to assembly, into the track recess 46. After applying the sealant the diaphragm assembly is mounted onto the selected combination of posts 50 until engagement is achieved between sealant 48 and the back surface 36 of the diaphragm assembly.

Once the diaphragm assembly is in position on posts 50, the posts are thermally deformed from the relation shown in FIG. 6 to the relation shown in FIG. 7. This is effected using a heat staking, thermal insertion or ultrasonic staking process for securing the diaphragm in place while at the same time compressing sealant 48. The result is a pressure seal or gasket between the enclosure and the diaphragm assembly encircling outlet 43 in communication with aperture inlet 42.

When the diaphragm assembly 16 is in place, dial plate 28 is secured to movement face 54, the pointer 26 is installed on a pointer shaft 56, and bezel 30 is secured to the casing for enclosing the unit.

By the above description there is disclosed a novel construction for a pressure gauge utilizing a diaphragm assembly as the pressure-sensitive element secured against an internal support surface of the casing by a combination of sealant and thermal staking.

By utilizing a plurality of apertures in the outer flange of the diaphragm assembly for positioned placement on lateral posts integral of the casing and overlying a controlled quantity of a sealant, the diaphragm assembly can be readily placed onto the posts, after which the posts are staked for securing the diaphragm assembly in place. Being as only one diaphragm assembly is utilized and without the necessity of employing any fastener hardware for securing the diaphragm assembly to the case, a simplicity in construction results from which a significant reduction in manufacturing costs can be achieved.

Since many changes could be made in the above construction and many apparently widely different embodiments of this invention could be made without departing from the scope thereof, it is intended that all matter contained in the drawings and specification shall be interpreted as illustrative and not in a limiting sense.

We claim:

1. In a pressure gauge for monitoring values of fluid pressure comprising:
    a) a casing having an internal cavity for enclosing the operating components of the gauge and defining an exterior inlet at which fluid pressure to be monitored can be communicated through an internal outlet to said cavity;
    b) a displaceable pointer operable for indicating values of pressure of fluid being received; and
    c) a diaphragm assembly secured within the cavity of said casing to receive fluid pressure communicated to the internal outlet of said casing for effecting operative pointer displacement in response to changes in pressure of fluid being received;
    d) said diaphragm assembly being secured to said casing within the casing cavity in a staked relation to a support thereat.

2. In a pressure gauge in accordance with claim 1 in which said casing includes a support surface surrounding said internal outlet, said diaphragm assembly has a rear surface defining an aperture into which fluid pressure can be received from said internal outlet and said diaphragm assembly is sealed onto said support surface in a sealed relation about said aperture with said aperture being in communication with said internal outlet.

3. A pressure gauge in accordance with claim 2 in which said diaphragm assembly includes a peripheral flange having a plurality of angularly spaced apertures and said casing includes integral posts laterally extending from about said support surface to receive and support the diaphragm assembly by extending through the apertures of said flange.

4. In a pressure gauge in accordance with claim 3 in which nearby posts have a predetermined angularly spacing therebetween and the angular spacing of the apertures on the flange of said diaphragm assembly are correlated to the angular spacings of said posts.

5. In a pressure gauge in accordance with claim 4 in which the angular spacing of said posts and said apertures permit setting said diaphragm assembly unto the support surface of said casing in a plurality of selectively different orientations about the support surface of the casing thereat.

6. In a pressure gauge in accordance with claim 3 in which said posts are staked against the flange of said diaphragm assembly.

7. In a pressure gauge in accordance with claim 6 in which said support surface includes a recessed track surrounding said internal outlet, and said track contains a controlled quantity of sealant for effecting a said sealed relation between said support surface and said diaphragm assembly.

8. In a pressure gauge in accordance with claim 1 in which said casing is comprised of a thermoplastic composition.

9. In a pressure gauge in accordance with claim 8 in which said composition comprises glass filled polysulfone (PSU).

10. The method of mounting a diaphragm assembly to the casing of a pressure gauge for monitoring pressure values of fluid supplied to the gauge and comprising the steps of:
 a) providing a casing having an internal cavity for enclosing the operating components of the gauge and defining an exterior inlet at which fluid pressure to be monitored can be communicated through an internal outlet to said cavity and including a support surface surrounding said internal outlet on which to support the diaphragm assembly,
 b) providing a diaphragm assembly adapted for position placement against the support surface of said casing, and
 c) securing the diaphragm assembly to said casing by thermally staking said diaphragm assembly to said casing.

11. The method in accordance with claim 10 in which the provided casing includes a plurality of angularly spaced posts integrally extending laterally from about said support surface, and said provided diaphragm assembly includes a peripheral flange containing a plurality of apertures adapted to be received onto said posts and said securing step includes thermally staking said posts against the received peripheral flange for securing said diaphragm assembly against said support surface.

12. The method in accordance with claim 11 in which said staking step is sequentially preceded by a step of applying a predetermined quantity of a sealant to one of the opposing surfaces of said diaphragm assembly or said support surface for said applied sealant to lie in an encircling relation about said internal outlet and said securing step compresses said sealant for effecting a sealed relation thereabout.

13. The method in accordance with claim 10 in which the provided casing is comprised of a thermoplastic composition.

* * * * *